Nov. 20, 1951     E. L. BLOOMQUIST     2,575,612
BOTTLE CARRYING MEANS
Filed March 10, 1947     2 SHEETS—SHEET 1
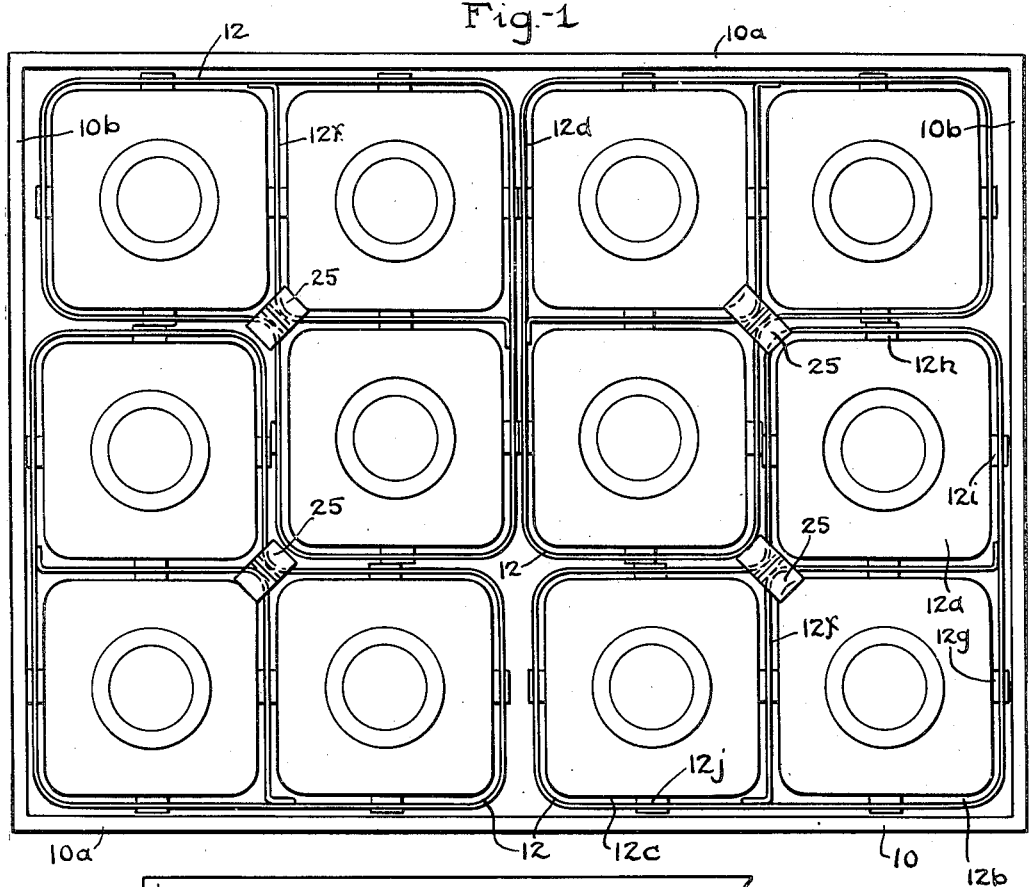
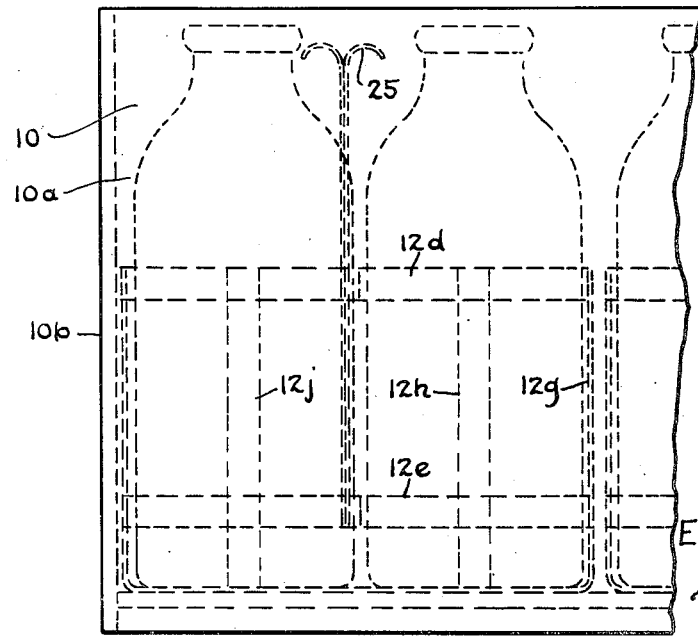
Inventor:
EGNER L. BLOOMQUIST
By Chas. C. Reif
Attorney.

Nov. 20, 1951  E. L. BLOOMQUIST  2,575,612
BOTTLE CARRYING MEANS
Filed March 10, 1947  2 SHEETS—SHEET 2
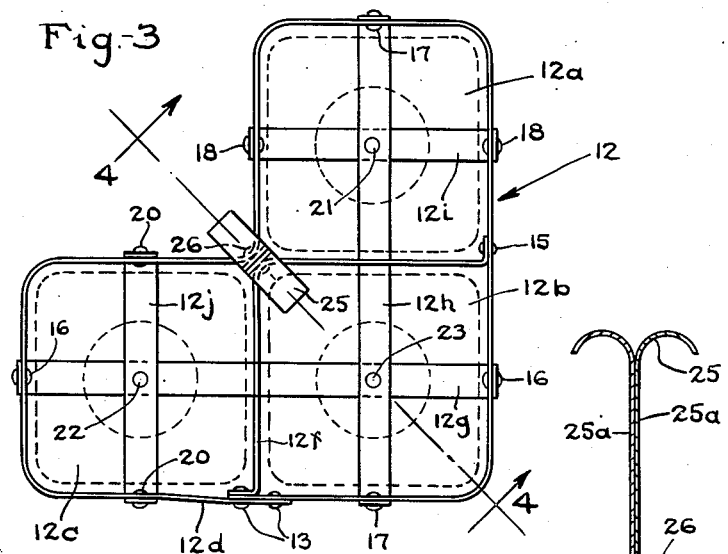
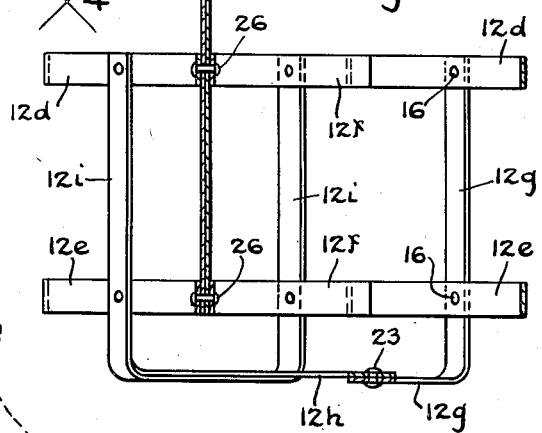
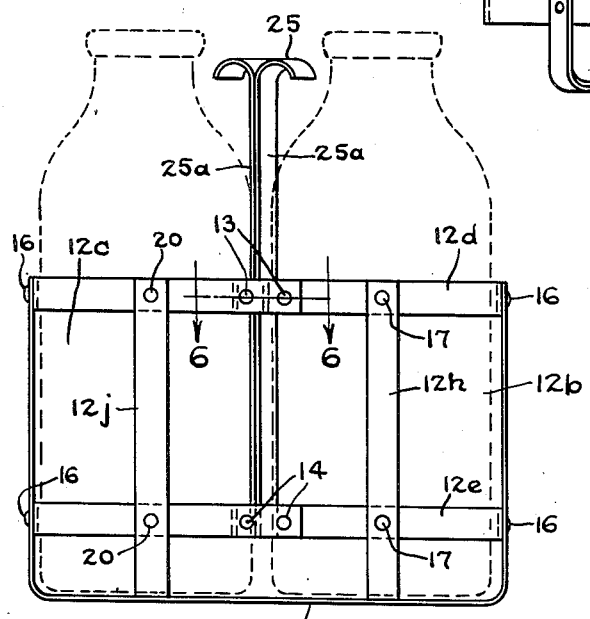
Inventor
EGNER L. BLOOMQUIST
By Chas. E. Reif
Attorney.

Patented Nov. 20, 1951

2,575,612

UNITED STATES PATENT OFFICE 2,575,612

BOTTLE-CARRYING MEANS

Egner L. Bloomquist, Minneapolis, Minn.

Application March 10, 1947, Serial No. 733,620

4 Claims. (Cl. 217—19)

This invention relates to a milk bottle container and carrier.

It is now the common custom to deliver milk to residences in vehicles in charge of an operator. The milk bottles are disposed in rectangular cases or boxes open at their upper ends and provided with partitions separating the bottles. When the operator wishes to deliver one or more bottles, he picks the bottle or bottles out of the box and if there are several bottles, he usually places them in a wire basket which he has and carries them in the basket to the door of the residence.

It is an object of this invention to provide a simple and efficient bottle carrier so constructed and arranged that it will fit and nest in a box in which the bottles are carried so that it can be quickly lifted with the bottles, the carrier forming partitions for the box and eliminating the necessity of picking the bottles out of a box and placing them in a separate carrier.

It is a further object of the invention to provide a milk container comprising a box or casing rectangular in plan and having an open upper end, together with a number of bottle carriers each having several compartments with open upper ends and preferably rectangular in plan, said compartments having their adjacent sides common or in close proximity, a handle secured to each of said carriers and upstanding therefrom, said handle terminating at or below the top of said casing, said compartments being so arranged in said carrier that they will nest in and substantially fit in said casing, said compartments being constructed and arranged respectively to receive milk bottles.

It is more specifically an object of the invention to provide a milk container comprising a box or casing of rectangular form and open at its upper end, together with a plurality of bottle carriers each comprising several compartments substantially square in plan and arranged side by side in L-shape, the transverse dimension of said compartments being substantially divisible in the length and width of said casing whereby said carriers will nest in and substantially fit in said casing.

It is still another object of the invention to provide a bottle carrier preferably of openwork formation and comprising a plurality of compartments having sides and bottoms and open upper ends, said compartments being rectangular in plan and arranged side by side, and a handle secured to and upstanding from said carrier substantially at the center thereof.

It is still further an object of this invention to provide a bottle carrier preferably of openwork structure comprising three compartments having bottoms and sides and being open at their upper ends, said compartments being substantially square in plan and arranged side by side in L-shaped form, and a handle secured to and upstanding from said carrier substantially at the angle formed by the outer compartments.

These and other objects and advantages of the invention will be fully set forth in the following description made in connection with the accompanying drawings in which like reference characters refer to similar parts throughout the several views and in which:

Fig. 1 is a plan view of a box or casing containing a plurality of milk bottle carriers;

Fig. 2 is a partial view in side elevation of said casing showing the bottle carriers and bottles therein in dotted lines;

Fig. 3 is a plan view of a bottle carrier used;

Fig. 4 is a vertical section taken on line 4—4 of Fig. 3, as indicated by the arrows;

Fig. 5 is a view in front elevation of the bottle carrier shown in Fig. 3; and

Fig. 6 is a horizontal section taken on line 6—6 of Fig. 5, as indicated by the arrows.

Referring to the drawings, a box or casing 10 is shown adapted to receive milk bottles. Casing 10 as shown is rectangular in plan as well as in longitudinal and transverse cross section and is open at its upper end. It comprises sides 10a and end portions 10b which will be made of suitable boards or plate material.

A bottle carrier 12 is provided, such as shown in Figs. 3 to 5, which carrier is of openwork construction and comprises three compartments 12a, 12b and 12c. Said compartments 12b are provided with sides and bottoms and are substantially rectangular in plan, and in the embodiment of the invention illustrated they are shown as substantially square in plan. While carrier 12 could be variously made, in the embodiment of the invention illustrated it is shown as made from strips of narrow and comparatively thin metal. One strip 12d at the top extends around three sides of compartment 12c, around three sides of compartment 12a and around two sides of compartment 12b, said strip having its ends overlapping and connected in any suitable manner, as by the rivets 13. A similar strip 12e is disposed some distance below strip 12d and adjacent the bottom of the carrier. Strip 12e likewise has its ends overlapping and secured together in any suitable manner, as by the rivets 14. Strips 12f are respectively connected to strips 12d and 12e, said strips being connected at one end by one of the rivets 13 or 14, then extending parallel to the sides of compartments 12b and 12c, then extending at right angles between compartments 12a and 12b and having their bent ends secured respectively to strips 12d and 12e in any suitable manner, as by rivets 15. A strip 12g extends across the bottom of compartments 12b and 12c centrally thereof, the same having its side portions extending vertically and disposed at the outer sides of strips 12d and 12e and being secured thereto in any suitable manner, as by rivets 16. Another strip 12h, similar to strip 12g, extends across the bottoms of compartments 12a and 12b, the same having its sides extending vertically at the outer sides of strips 12d and 12e and being secured thereto in any suitable manner, as by rivets 17. A smaller strip 12i extends across the bottom of compartment 12a centrally thereof and has its sides extending vertically at the outer sides of strips 12d and 12e and secured thereto in any suitable manner, as by rivets 18. Another strip 12j, similar to strip 12i, extends across the bottom of compartment 12c centrally thereof, the same having its sides extending vertically at the outer sides of strips 12d and 12e and secured thereto in any suitable manner, as by the rivets 20. Strip 12i extends beneath strip 12h in contact therewith and is secured thereto in any suitable manner, as by a rivet 21. Strip 12j extends across strip 12g above the same and in contact therewith and is secured thereto in any suitable manner, as by a rivet 22. Strips 12g and 12h likewise cross in contact at the bottom of compartment 12b and are secured together in any suitable manner, as by the rivet 23. A handle 25 is provided and while this could be variously formed, in the embodiment of the invention illustrated it is shown as formed of two strips of metal similar to the strips already described. These two strips 25a extend vertically and are disposed between the bends of strips 12d and 12e and the strips 12f at the corner of compartment 12b and adjacent the angle formed by the sides of compartments 12a and 12c. Strips 25a are secured to the strips 12d, 12e and 12f in any suitable manner, as by the rivets 26. The strips 25a are reversely curved at their upper ends to form finger holds. The height of handle 25 is preferably such that it will not extend above the top of casing 10. It will thus not interfere with another casing 10 being placed on top of casing 10.

In operation the carriers 12 are placed in the casing 10. The transverse dimension of the compartments 12a, 12b or 12c is substantially divisible into the length and width dimension of casing 10 so that the carriers 12 substantially fit in casing 10 and can be nested therein. While the compartments in the carrier might be variously arranged, in the embodiment of the invention illustrated they are shown arranged in L-shape. As shown in Fig. 1, they thus nest very nicely and conveniently in casing 10. The empty carriers can be placed in the casing 10 and the bottles then placed in the carriers and casing at the filling machine. This will take no more work than placing the bottles between the partitions now commonly forming a part of casing 10. The filled casing will be placed in the operator's vehicle. When he wishes to deliver bottles to a customer he merely has to lift one or two of the carriers 12 from the casing 10 by means of the handle 25 and can convey the same to the door of the residence. The carrier can be left with a customer and will be later picked up with the empty bottles. The customer can conveniently place the empty bottles in the carrier and the operator then picks up the carrier and replaces it in one of the boxes or casings 10.

From the above description it will be seen that I have provided a novel, simple and highly efficient means for containing and handling milk bottles. The carrier 12 is equally adapted to handle either round or square bottles. By the use of the device much time and labor are saved. The use of the device also results in much less breakage of bottles. The bottles are well protected as they are carried in the carrier and there is much less chance of breaking them than when they are thrown together in a wire basket. The housewife often sets bottles out on concrete steps or paving where they are knocked over and broken. Children often drop bottles trying to carry several at once. The present carrier will eliminate such breakage. The boxes or casings 10 can be handled with the same facility as the cases now used having fixed partitions therein. Another feature of the invention is that it tends to increase sales. The driver or operator will leave the carrier with three bottles therein, where if he dispensed single bottles he would probably only leave two. The carriers can be easily made and will be quite inexpensive. They are preferably made of metal or material which will be non-corrosive. The device has been amply demonstrated in actual practice and found to be very successful and efficient.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A milk bottle container having in combination, a casing of substantially rectangular form in plan and having an open upper end, a plurality of bottle carriers disposed in said casing, each comprising three compartments having common sides and being open at their upper ends, each compartment being constructed and arranged to receive a milk bottle, said compartments being arranged in L-shape in plan, said carriers thus being constructed and arranged to interfit in said casing, fit therein and substantially fill the area thereof, whereby said carriers form partitions in said casing for bottles.

2. A milk bottle container having in combination, a casing of substantially rectangular form in plan and having an open upper end, a plurality of bottle carriers disposed in said casing, each comprising several compartments of sufficient transverse dimension to receive a milk bottle, said compartments being rectangular in plan and arranged side by side in L-shape in plan so that said carrier forms a unit, the transverse dimension of said compartments being substantially divisible into the length and width dimensions of said casing, whereby said carriers interfit in said casing and occupy substantially the whole area thereof.

3. The structure set forth in claim 1 and a supporting handle for each of said carriers having its top at or below the top of said casing whereby another casing can be placed on top of said casing and will not be interfered with by said bottles or handles.

4. A milk bottle carrier of open work construction and comprising walls forming a plurality of compartments substantially square in plan having their bottoms substantially in one plane and the center compartment having a common wall with each of the end compartments respectively, said compartments being open at their upper ends, said carrier thus being of L-shape in plan, one compartment being at the corner of said L and the other two compartments being at adjacent sides of said L, there being no spaces between the adjacent sides of said compartments and a handle extending vertically from the common corner of said compartments and being of less height than a standard milk bottle disposed in one of said compartments.

EGNER L. BLOOMQUIST.

REFERENCES CITED

The following references are of record in the file of this patent:

UNITED STATES PATENTS

| Number | Name | Date |
| --- | --- | --- |
| 728,018 | Roudil | May 12, 1903 |
| 1,017,432 | Lindahl | Feb. 13, 1912 |
| 1,070,212 | Wedmore | Aug. 12, 1913 |
| 1,781,357 | Wolcott | Nov. 11, 1930 |
| 1,906,647 | Smith et al. | May 2, 1933 |
| 1,948,202 | Chapman | Feb. 20, 1934 |
| 2,049,884 | Wurster et al. | Aug. 4, 1936 |

FOREIGN PATENTS

| Number | Country | Date |
| --- | --- | --- |
| 636,191 | France | Jan. 7, 1928 |